Patented Dec. 13, 1932

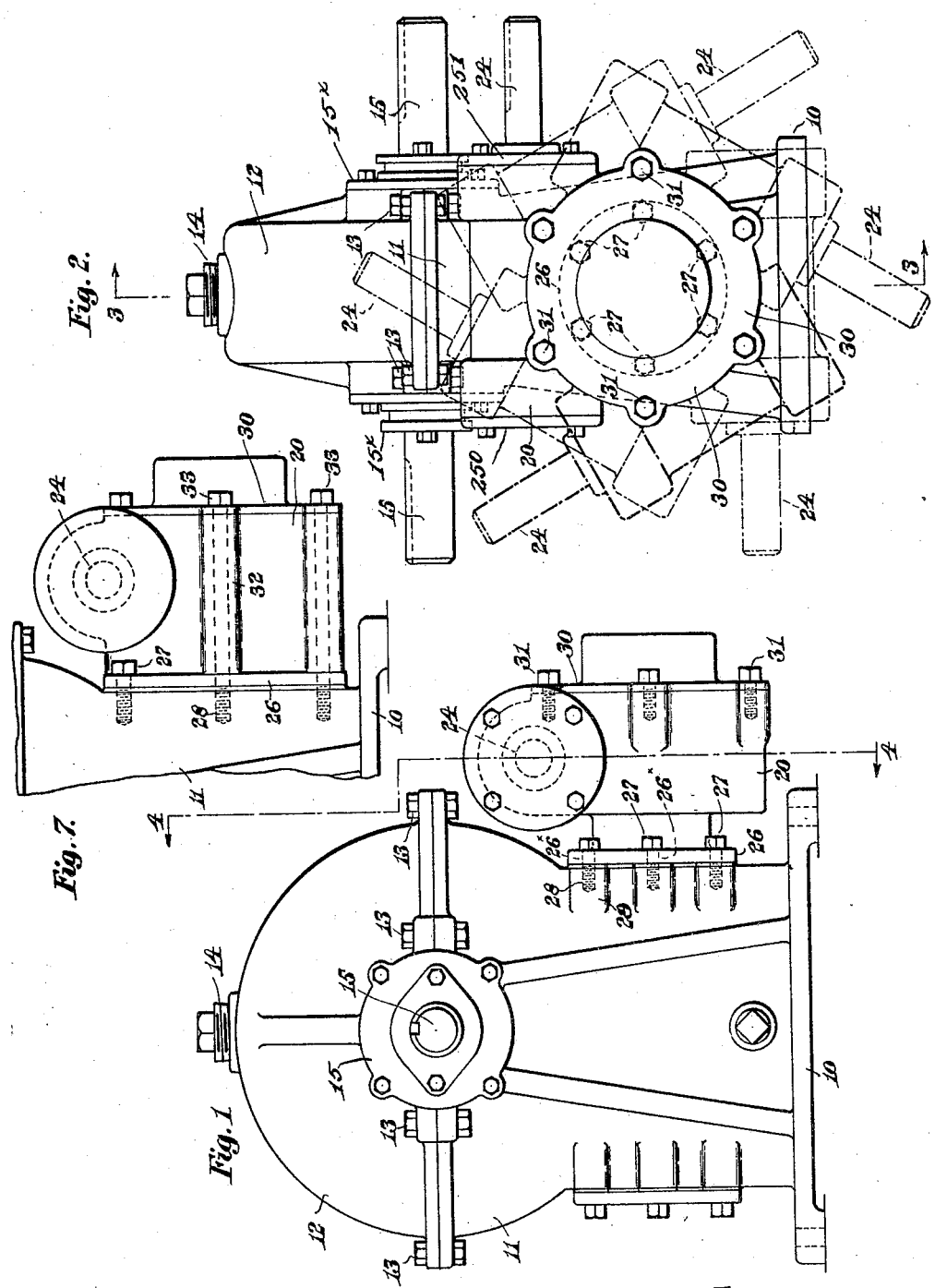

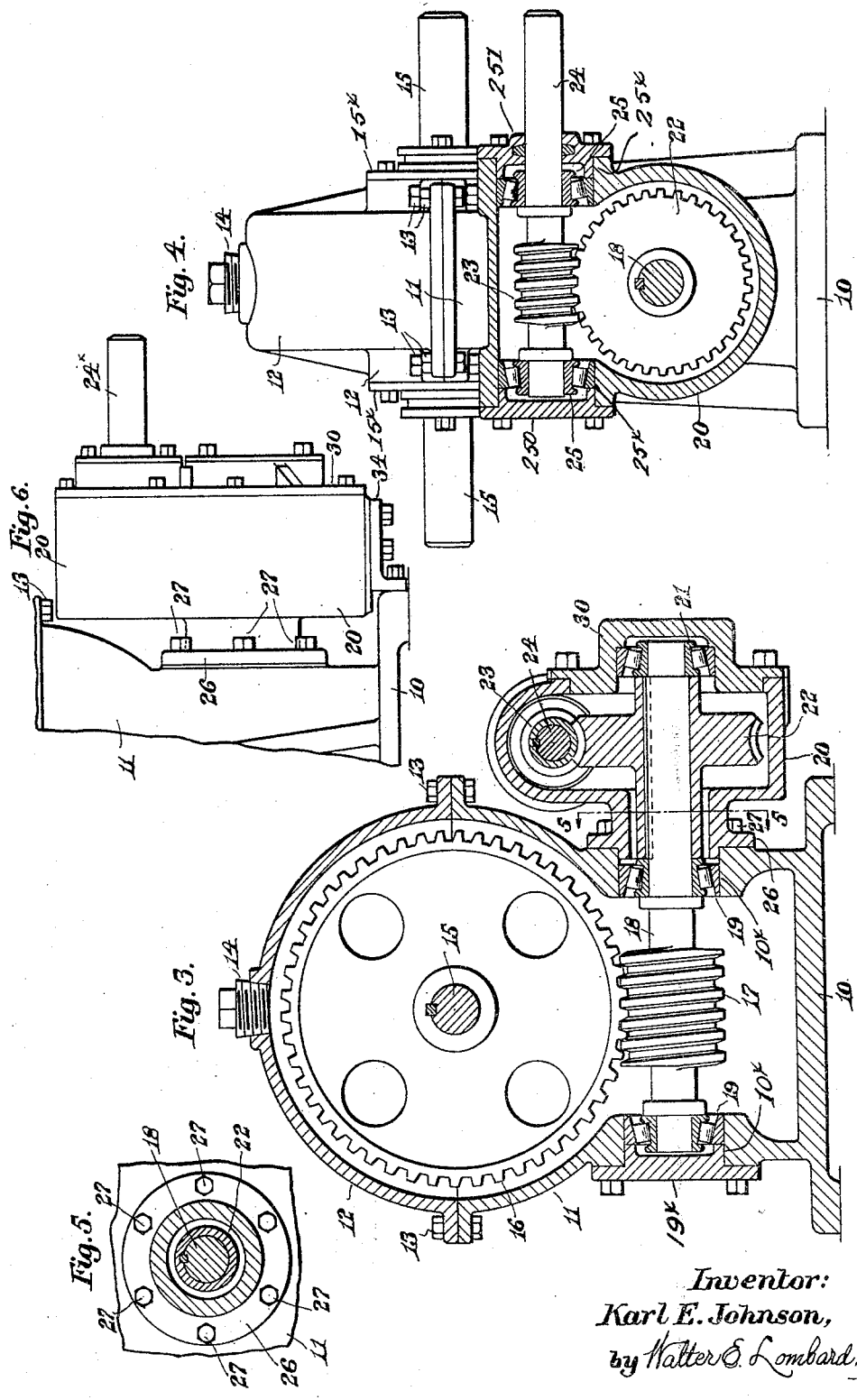

1,890,685

UNITED STATES PATENT OFFICE

KARL E. JOHNSON, OF QUINCY, MASSACHUSETTS, ASSIGNOR TO BOSTON GEAR WORKS, INC., OF QUINCY, MASSACHUSETTS, A CORPORATION OF MASSACHUSETTS

COMPOUND SPEED REDUCER

Application filed February 28, 1931. Serial No. 519,092.

This invention relates to compound speed reducers and has for its object the production of a device of this character the gear containing casing of which is made in two parts, one part being adapted for installation on the other part in a plurality of different positions.

This object is attained by the mechanism illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings:

Figure 1 represents the side elevation of a compound speed reducer embodying the principal features of the present invention.

Figure 2 represents an end elevation of the same.

Figure 3 represents a vertical section of the same on line 3, 3, on Fig. 2.

Figure 4 represents a vertical transverse section on line 4, 4, on Fig. 1.

Figure 5 represents a transverse section on line 5, 5, on Fig. 3, and

Figures 6 and 7 represent elevations showing modifications of the manner of securing the supplemental casing to the main casing.

Similar characters indicate like parts throughout the several figures of the drawings.

In the drawings, 10 is the base of a casing having a semi-cylindrical upper portion 11 to which is secured a removable semi-cylindrical cover 12 by means of bolts 13.

The upper end of this cover 12 has threaded thereto a plug 14 which may be removed to admit lubrication to the interior of the casing.

Extending through the casing 11, 12 is a shaft 15, the opposite ends of which project beyond the side walls of the casing, as shown in Fig. 2. The shaft 15 rotates in annular bearings $15x$ secured to the opposite faces of the two parts 11, 12 of the main casing. By removing these bearings $15x$ and the upper part 12 of the main casing, the shaft 15 may be removed from said casing.

Keyed to this shaft 15 is a worm gear 16 which meshes with a worm 17 on a shaft 18 rotatably mounted in anti-friction bearings 19 disposed in the lower portion of the casing 11, 12 as indicated in Fig. 3 of the drawings. The worm 17 has a greater diameter than the shaft 18 and the bearings 19 are mounted in openings $10x$ large enough to permit the removal of the worm 17 therethrough, one of said openings being closed by a plate $19x$.

One end of the shaft 18 projects beyond the wall of the casing into a supplemental casing 20 provided with an anti-friction bearing 21 to receive the end of the shaft 18.

This shaft 18 has secured thereto a worm gear 22 meshing with a worm 23 on a shaft 24 rotatable in anti-friction bearings 25 disposed in the walls of the supplemental casing 20. The worm 23 is of larger diameter than the shaft 24 and the bearings 25 are disposed in openings $25x$ large enough to permit the removal of said gear 23 and shaft 24 therethrough, these openings being closed by members 250 and 251.

The shaft 24 is the driving shaft and rotary movement is imparted therefrom through the worm 23, worm gear 22, shaft 18, worm 17 and worm gear 16 to the shaft 15. One end of the shaft 24 extends through the member 251 and power may be applied to the projecting end thereof.

A machine to be driven may be coupled to either end of the shaft 15.

The supplemental casing 20 is provided with the flange 26 having holes $26x$ extending therethrough at equal distances from the axis of the shaft 18 and spaced apart at equal distances.

These bolts 27 are threaded to holes 28 in bosses 29 formed upon the walls of the main casing 11.

These holes 28 are the same distance from the axis of the shaft as the holes $26x$ in the flange 26 and are similarly spaced apart.

The supplemental casing 20 has a cover plate 30 secured thereto by means of the bolts 31 and in which is disposed the bearing 21. By removing the plate 30 the gear 22 may be removed from the casing 20.

By having the holes 26x and 28 all at the same distance from the axis of shaft 18 and accurately spaced apart an equal distance, it is obvious that the supplemental casing 20 may be adjusted about the axis of said shaft 18 and secured to the main casing 11 in a plurality of positions, as indicated by full and dotted lines in Fig. 2.

This makes it possible to utilize the compound speed reducer in different installations where it may be necessary to couple up with a driving element at an entirely different angle from that of the driven shaft 15.

It is obvious from an inspection of Fig. 2 of the drawings that the supplemental casing 20 may be secured to the main casing 11 in six entirely different positions, and this is a great advantage as it dispenses with the necessity of constructing a different compound speed reducer for every different installation.

In some cases it is desirable to have bosses 32 formed on the walls of the supplemental casing 20 and have bolts 33 extending through the cover 30 and these bosses 32 with their ends threaded to the holes 28 in the main frame 11, all as shown in Fig. 7 of the drawings.

In some cases it is desirable to have the supplemental casing 20 formed as shown in Fig. 6 and enclosing other driving elements such as spur gears or helical gears between the drive shaft 24x and the worm shaft 18, this shaft 24x being perpendicular to the shaft 15.

In this form of supplemental casing a bracket 34 secured to the base 10 may support the bulk of the weight of the casing while permitting it to be adjusted about the axis of the shaft 18.

It is believed that the operation and many advantages of the invention will be understood without further description.

Having thus described my invention, I claim:

1. In a compound speed reducer for actuating heavy machinery, a large main chambered casing having upper and lower parts, the lower part being provided with a base flange by which the casing may be secured rigidly to a stationary member in fixed position and provided at the top with an opening whereby said casing may be filled with lubricant; driving mechanism in the chamber of said casing including a horizontal driving shaft extending through one side wall of said casing adjacent the base thereof; a thrust bearing for the inner end of said shaft in the opposite wall of said casing; a gear disposed outside of said main casing on the projecting end of said driving shaft; means coacting with said gear for rotating said driving shaft; said rotating means being in a plane perpendicular to said shaft; a smaller supplemental casing enclosing said gear and shaft-rotating means and provided with a bearing through which projects a cylindrical extension of said shaft-rotating means; said smaller casing having a centering projection in a cylindrical opening in a wall of the larger casing; and means whereby said supplemental casing may be moved in a vertical plane about the axis of said gear and be secured to said main casing in a plurality of immovable positions radial to the axis of said shaft.

2. In a compound speed reducer for actuating heavy machinery, a large main chambered casing comprising upper and lower parts, one wall of the lower part being provided with an annular finished face having a plurality of threaded holes extending inwardly therefrom and equally spaced apart, the lower part of said casing having a supporting base provided with holes whereby it may be secured rigidly to a stationary member; driving mechanism in the chamber of said casing including a horizontal driving shaft one end of which extends through the annular finished faced wall of said casing; a gear disposed outside of said main casing on the projecting end of said horizontal shaft; means coacting with said gear for rotating said shaft, said rotating-means being in a plane perpendicular to the axis of said shaft; a smaller supplemental casing enclosing said gear and shaft-rotating means and provided with a bearing through which projects a rotatable cylindrical extension of said shaft-rotating means; and a plurality of bolts equally spaced apart extending through portions of said supplemental casing and adapted to coact with any of said threaded holes whereby the supplemental casing may be secured in either of several positions radial to the axis of said shaft.

3. In a compound speed reducer for actuating heavy machinery, a large main chambered casing one wall of which near the bottom thereof is provided with an annular finished face having a plurality of threaded holes extending inwardly therefrom and equally spaced apart; driving mechanism therein including a horizontal driving shaft extending through the annular finished faced wall of said casing; a gear disposed outside of said main casing on the projecting end of said shaft; means coacting with said gear for rotating said shaft, said rotating-means being in a plane perpendicular to the axis of said shaft; a smaller supplemental casing enclosing said gear and shaft-rotating means and having an annular finished face coacting with that of the main casing, said supplemental casing being provided with a bearing for a rotatable cylindrical extension of said shaft-rotating means; a plurality of bolts extending through portions of said supplemental casing and adapted to coact with any of said threaded holes, said bolts being equally spaced apart; and a shaft rotated by said driving mechanism and projecting through opposite walls of said main casing whereby a machine may be driven from either end of said shaft.

4. In a compound speed reducer for actuating heavy machinery, a main chambered casing comprising upper and lower parts, the lower part having provision for securing it rigidly to a stationary member in fixed position; a speed reduction mechanism in the chamber of said casing including a driven shaft extending through the opposite walls thereof, a worm gear on said driven shaft, and a worm meshing therewith provided with a horizontal driving shaft of less diameter than said worm extending from said main casing; annular bearings for said driven shaft secured to the two parts of said casing; a smaller supplemental casing adapted to be moved in a vertical plane about the axis of said worm shaft and be secured to said main casing in a plurality of immovable positions; said supplemental casing being adapted to contain lubricant; and driving mechanism for said worm confined within said supplemental casing and movable therewith about the axis of said shaft, said supplemental casing being provided with a bearing through which extends a shaft of said worm-driving mechanism.

5. In a compound speed reducer for actuating heavy machinery, a large main chambered casing comprising upper and lower parts, the lower part having provision for securing it rigidly to the stationary member in fixed position; driving mechanism in the chamber of said casing including a horizontally disposed driving shaft extending through a side wall of said casing and having its inner end disposed in a thrust bearing in another wall of said casing; a gear disposed outside of said main casing on the projecting end of said driving shaft; means coacting with said gear for rotating said shaft; a smaller supplemental casing enclosing said gear and shaft-rotating means, said supplemental casing being movable about the axis of said shaft in a vertical plane and being provided with bearings for the outer end of said shaft and of said shaft-rotating means; a cover for the outer end of said supplemental casing; and a plurality of bolts extending through said cover and the body portion of said supplemental casing, said bolts being equally spaced apart and adapted to be threaded to holes in the main casing equally spaced apart whereby the said shaft-rotating means may be moved in a plane perpendicular to said shaft and be secured to said main casing in a plurality of immovable positions radial to the axis of the shaft in the main casing.

6. In a compound speed reducer for actuating heavy machinery, a large main chambered casing having provision for securing it rigidly to a stationary member in fixed position and adapted to contain lubricant; driving mechanism in the chamber of said casing including a worm and a coacting worm gear mounted on a revoluble shaft extending through the opposite walls of said casing whereby machines may be driven from the opposite ends of said shaft; a driving shaft for said worm extending through a side wall of said casing; a worm gear disposed outside of said main casing on the projecting end of said driving shaft; a second worm coacting with said second mentioned gear for rotating said driving shaft, the axis of said second worm being in a plane perpendicular to the axis of said driving shaft; a smaller supplemental casing adapted to contain lubricant and enclosing said second mentioned worm gear and second worm and provided with a bearing in one wall thereof through which projects a rotatable extension of said second worm; and means for positively securing said supplemental casing to said main casing in a plurality of positions radial to the axis of said shaft.

7. In a compound speed reducer for actuating heavy machinery, a large main chambered casing comprising upper and lower parts, the lower part having provision for securing it rigidly to a stationary member in fixed position; driving mechanism in the chamber of said casing including a main shaft extending through a side wall of said casing and provided with means whereby it may be coupled to a machine to be driven; annular bearings for said shaft secured to both parts of said casing; a worm gear secured to said main shaft; a worm coacting with said worm gear; a horizontal shaft for said worm extending from said casing; a gear disposed outside of said main casing on the projecting end of said horizontal worm shaft; means coacting with said second mentioned gear for rotating said worm shaft; a smaller supplemental casing adapted to contain lubricant and enclosing said second mentioned gear and shaft-rotating means and provided with a bearing in one wall thereof through which projects a rotatable extension of said shaft-rotating means and means whereby said supplemental casing may be moved in a vertical plane about the axis of said second mentioned gear and be secured in immovable position to said main casing in a plurality of positions radial to the axis of said shaft.

8. In a compound speed reducer for actuating heavy machinery, a large main chambered casing comprising upper and lower parts, the lower part having provision for securing it rigidly to a stationary member in fixed position and provided with means whereby said casing may be filled with lubricant; driving mechanism in the chamber of said casing including a main shaft extending through a side wall of said casing and provided with means whereby it may be coupled to a machine to be driven and a supplemental shaft also projecting through a wall of the main casing; annular bearings for said main shaft secured to both parts of said casing; a gear disposed outside of said main casing on the projecting end of said supplemental shaft; means coacting with said gear for rotating said supplemental shaft, said rotating means being in a plane perpendicular to said shaft; a smaller supplemental casing adapted to contain lubricant and enclosing said gear and shaft-rotating means and provided with a bearing through which projects a rotatable extension of said shaft-rotating means; and means whereby said supplemental casing may be moved about the axis of said gear and be secured rigidly to said main casing in a plurality of positions radial to the axis of said shaft.

9. In a compound speed reducer for actuating heavy machinery, a large main chambered casing comprising upper and lower parts, the lower part being provided with an annular finished face having a plurality of threaded holes extending inwardly therefrom and equally spaced apart, said casing having a supporting base provided with holes whereby it may be secured rigidly to a stationary member; driving mechanism in the chamber of said casing including a horizontal shaft extending through the annular finished faced wall of said casing; a gear disposed outside of said main casing on the projecting end of said shaft; means coacting with said gear for rotating said shaft, said rotating means being in a plane perpendicular to the axis of said shaft; a smaller T-shaped supplemental casing adapted to contain lubricant and enclosing said gear and shaft-rotating means and provided with a bearing through which projects a rotatable extension of said shaft-rotating means; and a plurality of bolts equally spaced apart extending through portions of said supplemental casing and adapted to coact with any of said threaded holes whereby the supplemental casing may be secured immovably in either of several positions radial to the axis of said shaft.

10. In a compound speed reducer for actuating heavy machinery, a main chambered casing having provision for securing it to a stationary member in fixed position and adapted to be filled with lubricant; a speed reduction mechanism in the chamber of said casing including a driven shaft extending through the opposite walls thereof and provided at opposite ends with means whereby it may be coupled to one or more machines to be driven, a worm gear on said driven shaft, and a worm meshing with said gear and provided with a horizontal shaft extending from said main casing; a smaller supplemental casing communicating with the main casing adapted to be moved in a vertical plane about the axis of said worm shaft and be secured immovably to said main casing in a plurality of positions radial to said axis; and driving mechanism for said worm confined within said supplemental casing and movable therewith about the axis of said shaft, said supplemental casing being provided with bearings for said driving mechanism and through one of which projects a rotatable member forming part of said worm-driving mechanism.

11. In a compound speed reducer for actuating heavy machinery, a large main chambered casing comprising upper and lower parts, the lower part having provision for securing it to a stationary member in fixed position and adapted to be filled with lubricant; driving mechanism in the chamber of said casing including a horizontal shaft extending through a side wall of said casing; a gear disposed outside of said main casing on the projecting end of said shaft; means coacting with said gear for rotating said shaft; a smaller supplemental casing communicating with the main casing and enclosing said gear and shaft-rotating means, said supplemental casing being movable about the axis of said shaft in a vertical plane and being provided with bearings for the shaft of said shaft-rotating means through one of which bearings projects the last mentioned shaft with its end provided with means whereby it may be coupled to a rotatable actuating member; a cover for the outer end of said supplemental casing, and a plurality of bolts extending through said cover and body portion of said supplemental casing, said bolts being equally spaced apart and adapted to be threaded to holes in the main casing equally spaced apart whereby the said shaft-rotating means may be moved in a plane perpendicular to said shaft and be secured immovably to said main casing in a plurality of positions radial to the axis of the shaft in the main casing.

12. In a compound speed reducer for actuating heavy machinery a large main chambered casing provided with a base flange by which it may be secured rigidly to a stationary member in fixed position, said casing comprising upper and lower parts, the upper part being removable; driving mechanism in the chamber of said casing including a driving shaft extending through a side wall thereof; a gear disposed outside of said main casing on the projecting end of said driving shaft; a thrust bearing for the inner end of said shaft; means coacting with said gear for rotating said shaft, said rotating means being in a plane perpendicular to the axis of said shaft; a smaller supplemental casing enclosing said gear and shaft-rotating means and provided with a bearing for the outer end of said driving shaft, said shaft-rotating means including a cylindrical extension projecting through a wall of said supplemental casing and provided with means whereby it may be coupled to a rotating actuating member; and means for rigidly securing said supplemental casing to said main casing in a plurality of positions radial to the axis of said driving shaft.

13. In a compound speed reducer for actuating heavy machinery, a large main chambered casing divided horizontally, the lower part having a base flange by which said casing may be secured rigidly to a stationary member in fixed position, and adapted to be filled with lubricant; driving mechanism in the chamber of said casing including a driving shaft extending through one side wall of said casing and having its inner end in a thrust bearing in the opposite wall; a worm gear disposed outside of said main casing on the projecting end of said shaft; a worm coacting with said worm gear for rotating said driving shaft, the axis of said worm being in a plane perpendicular to the axis of said shaft; a smaller supplemental casing enclosing said worm gear and worm and provided with a bearing in one wall thereof through which extends a cylindrical extension of said worm; a removable member alined with the worm and provided with a bearing for the inner end of said worm; and means for securing said supplemental casing to said main casing in a plurality of immovable positions radial to the axis of said shaft.

14. In a compound speed reducer for actuating heavy machinery, a large main chambered casing comprising upper and lower parts, the lower part having provision for securing it rigidly to a stationary member in fixed position and provided at the top with an opening whereby said casing may be filled with lubricant; driving mechanism in the chamber of said casing including a horizontal driving shaft extending through a side wall of said casing; a gear disposed outside of said main casing on the projecting end of said shaft; means coacting with said gear for rotating said driving shaft; a smaller supplemental casing enclosing said gear and shaft-rotating means and provided with a bearing in one wall thereof through which projects a cylindrical extension of said shaft-rotating means; said supplemental casing having an annular flange projecting into a wall of the main casing, said annular flange being spaced from the driving shaft extending therethrough; and means whereby said supplemental casing may be moved in a vertical plane about the axis of said gear in a plane perpendicular to said shaft and be secured rigidly in adjusted position to said main casing in a plurality of positions radial to the axis of said shaft.

15. In a compound speed reducer for actuating heavy machinery, a large main chambered casing comprising upper and lower parts, the lower part having provision for securing it rigidly to a stationary member in fixed position; a worm gear in the chamber of said casing; a shaft extending through a side wall of said casing to which said worm gear is secured; a worm below said worm gear and meshing therewith; a shaft to which said worm is secured extending horizontally through a wall of the lower part of said casing; a gear disposed outside of said main casing on the projecting end of said worm shaft; means coacting with said gear for rotating said worm shaft, said rotating means being in a plane perpendicular to the axis of said shaft; a smaller supplemental casing adapted to contain lubricant and enclosing said gear and shaft-rotating means, said shaft-rotating means including a cylindrical extension projecting through a wall of said supplemental casing and provided with means whereby it may be coupled to a rotating actuating member; and means for positively securing said supplemental casing to said main casing in various immovable positions radial to the axis of said worm shaft.

Signed by me at Quincy, Massachusetts, this 26 day of February, 1931.

KARL E. JOHNSON.